United States Patent [19]

McQuaid

[11] 4,382,103

[45] May 3, 1983

[54] MASTER FOR DEVICE REPLICATION

[75] Inventor: Paul E. McQuaid, Canoga Park, Calif.

[73] Assignee: Xerox Corporation, Stamford, Conn.

[21] Appl. No.: 300,084

[22] Filed: Sep. 8, 1981

[51] Int. Cl.$^3$ .......................... B05D 5/06; B29C 3/00; B29C 5/00

[52] U.S. Cl. .................................... 427/145; 264/2.5; 427/162; 427/164

[58] Field of Search ...................... 427/145, 162, 164; 264/2.5

[56] References Cited

PUBLICATIONS

Laser Focus, p. 10, Jun. 1981.

*Primary Examiner*—James R. Hoffman
*Attorney, Agent, or Firm*—Leonard Zalman

[57] ABSTRACT

A layer of an ion exchanged glass is utilized as the master for video disc production. Due to the ion exchange, such glass possesses stored energy in the form of compressive stress. When localized portions of the layer of ion exchanged glass are heated sufficiently, those portions of the glass soften and release the compressive stress energy in the form of localized surface bumps. The presence or absence of surface bumps and/or their height can convey the video information in analog or binary form. Once the ion exchanged master is formed, the master is used in a conventional manner to produce mirror image copies on a suitable, conventional substrate, generally a plastic. The copies are generally formed by a pressing or stamping technique, or by an injection molding technique. The relief surface of the copies can be coated with a conventional light reflective layer to aid in optical read-out of the video information stored by the relief surface.

9 Claims, 4 Drawing Figures

MASTER FOR DEVICE REPLICATION

BACKGROUND OF THE INVENTION

Video discs are manufactured by producing a "master" with the video information recorded in surface relief, and using the master to press, or mold, mirror images of the relief into a suitable substrate. In one method conventionally used to produce a master, a thin film of a material having a low melting point and low thermal conductivity, such as bismuth, tellurium or tellurium-based media, is applied to a suitable substrate, such as glass and selected, localized portions of the film are then ablated to form pits which have a sequential correspondence to the video data. A series of other operations are then performed in order to provide a mirror image of the sequence of pits, that is, a sequence of bumps or protrusions which provide the surface relief. Once attained, the master is used in a press or injection molding apparatus to obtain on a plastic disc mirror image copies of the surface relief.

For several reasons, it would be highly advantageous to be able to form the surface relief directly; i.e., without initial formation of a sequence of ablated pits. For example, a directly formed master would be less expensive to manufacture and could utilize materials less costly than tellurium, the ablation process results in vaporization debris which may provide a lower than desired signal-to-noise ratio, and tellurium has toxicity concerns.

SUMMARY OF THE INVENTION

According to the invention, a layer of an ion exchanged glass is utilized as the master for video disc production. Due to the ion exchange, such glass possesses stored energy in the form of compressive stress. When localized portions of the layer of ion exchanged glass are heated sufficiently, those portions of the glass soften and release the compressive stress energy in the form of localized surface bumps. The presence or absence of surface bumps and/or their height can convey the video information in analog or binary form. An ion exchanged master is inherently a low cost master due to the direct formation of surface bumps, as well as its use of a readily available, low cost, non-toxic material; i.e., glass. Furthermore, the ion exchange master will provide a high signal-to-noise ratio since there is no ablation debris.

Once the ion exchanged master is formed, the master is used in a conventional manner to produce mirror image copies on a suitable, conventional substrate, generally a plastic. The copies are generally formed by a pressing or stamping technique, or by an injection molding technique. Once formed, the relief surface of the copies can be coated with a conventional light reflective layer to aid in optical read-out of the video information stored by the relief surface.

DETAILED DESCRIPTION OF THE INVENTION

Figure 1:
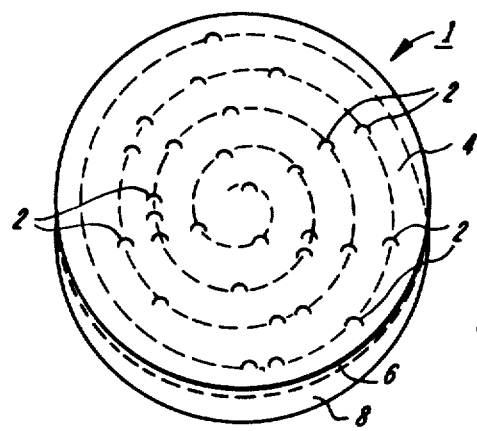
FIG. 1 is a perspective view of a "master" in accordance with the invention.

Referring to FIG. 1, a video disc master 1 stores a continuous track of video data in the form of small discrete, solid bumps 2 on the surface 4 of the ion exchanged surface layer portion 6 of a glass substrate 8. Glass substrate 8 can be a conventional borosilicate glass containing an appropriate oxide modifier such as, for example, Corning Glass 7740 which is a borosilicate glass containing 4 mole percent sodium oxide ($Na_2O$) as an oxide modifier. The ions of the oxide modifier of an acceptable glass are dispersed in a loose bonding arrangement within the glass lattice whereby the ions of the oxide modifier, sodium ions ($Na^+$) in the glass specified, are very mobile within the glass lattice. Since the oxide modifier is added while the glass is molten, during its manufacture, the glass substrate 8 contains very little stored energy in the form of stress.

A relatively large quantity of energy, in the form of compressive stress, is stored within the surface layer portion 6 via an ion exchange. Such an ion exchange is accomplished by exposing the substrate 8 to exchange ions that have a greater affinity for occupying lattice sites of the glass than do the ions of the modifier oxide. In a specific embodiment, copper ions ($Cu^+$) are made to exchange lattice sites with the sodium ions ($Na^+$) of the referenced borosilicate glass 7740, that is, sodium ions are made to out-diffuse or vacate lattice sites of the glass and those vacated lattice sites are occupied by copper ions. Due to the copper ions having an atomic radius (0.98 Å) which is slightly larger than the atomic radius of the sodium ions (0.96 Å), the ion exchanged layer portion 6 contains stored energy in the form of compressive stress.

Figure 2:
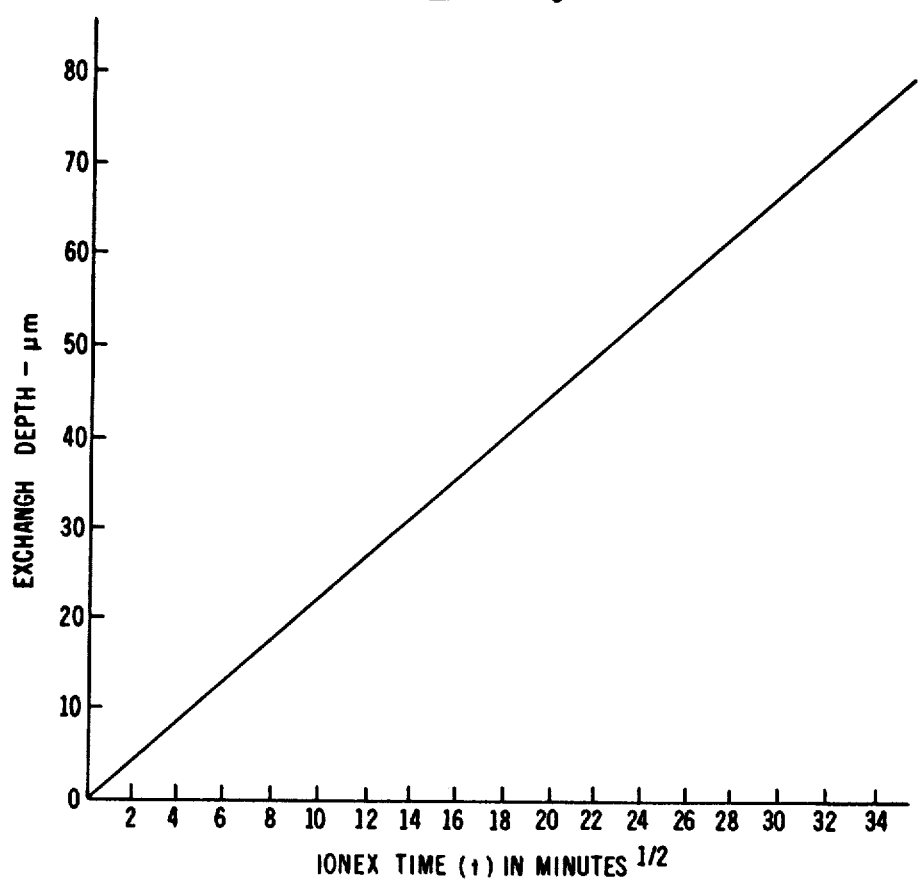
FIG. 2 is a graph showing depth of ion exchange layer as a function of time.

The specified ion exchange is accomplished by immersing the 7740 glass in a molten bath of cuprous chloride for a period of time. Although the temperature of the bath is not critical, 550° Centigrade being satisfactory, care must be taken not to vaporize the cuprous chloride since such vapors are toxic. The depth of the ion exchanged layer portion 6 is a square root function of the exchange time, that is, the time that the 7740 glass is in the bath. Specifically, $d = 2.094 \sqrt{t}$ where $d =$ depth of layer 6 in microns and $t =$ time in molten bath in minutes. FIG. 2 is a graph showing the depth in microns of the layer portion 6 as a function of exchange time in minutes for a 550° Centigrade bath. In FIG. 1, an ion exchanged layer 6 is on only one side of the substrate due to appropriate masking during the bath or lapping thereafter, but an ion exchange layer can be provided along both planar surfaces if it is desired to have a dual-sided master.

Figure 3:
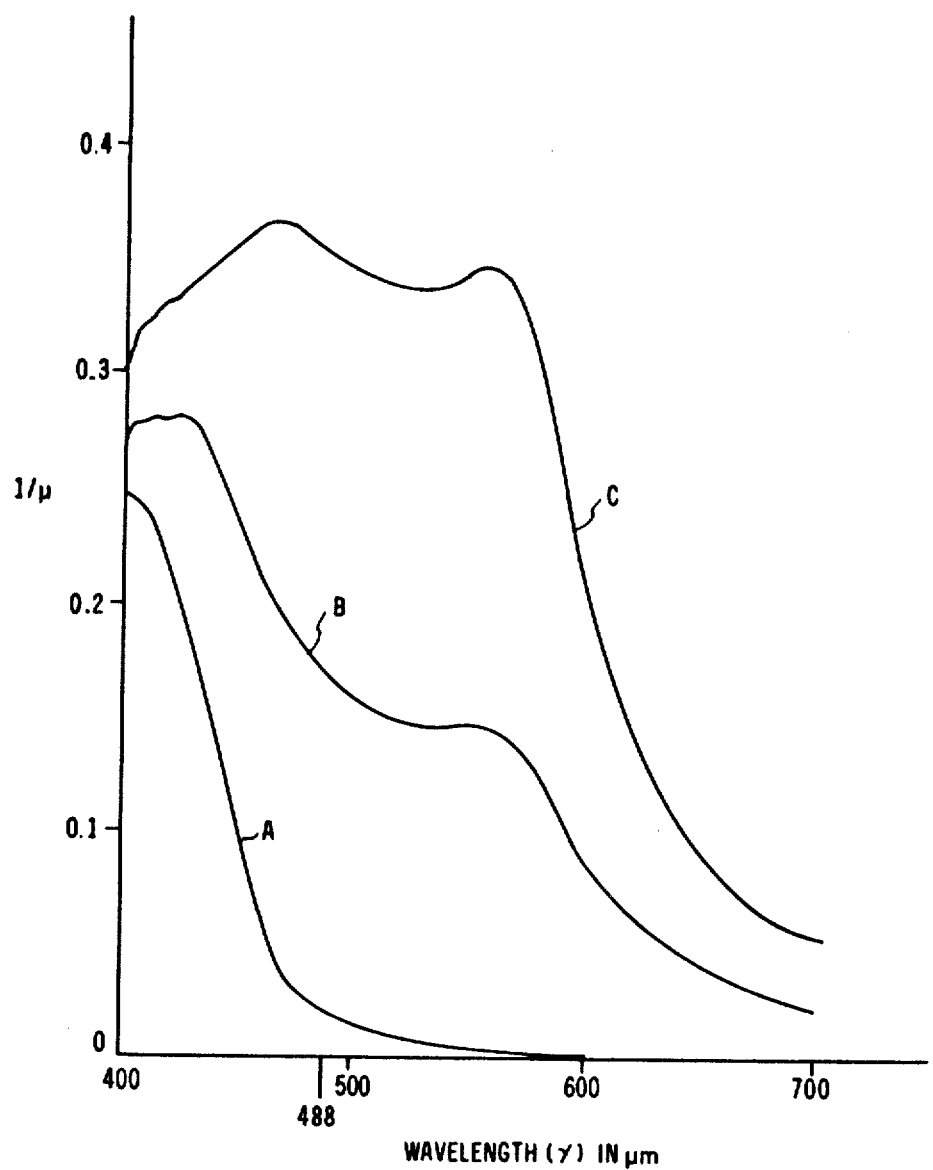
FIG. 3 shows the absorption spectra on ion exchanged layers.

In addition to storing energy in the form of compressive stress within layer portion 6, the ion exchange can also change the optical absorption spectra of layer portion 6. When CuCl and 7740 glass provide the ion exchanged layer 6, layer 6 is colored (darkened) and its optical absorptivity is increased. Curve A of FIG. 3 is a plot of the absorption spectra of a layer of copper ion exchanged 7740 glass. Note that the ion exchanged layer has relatively good absorptivity at the blue end of the spectrum, the wavelength of the emission from conventional Argon and Helium-Cadmium lasers, making such lasers acceptable sources of video signal conveying write beam energy for the ion exchange glass video disc master disclosed. The increased optical absorptivity (as compared to the glass prior to ion exchange) permits a significant amount of write beam energy to be absorbed at discrete localized portions of the ion exchanged layer 6, with the heat resulting from that absorption softening, or making pliant, the ion exchanged layer at those discrete localized portions. The stored compressive stress energy "pushes" on the pliant heated portions, causing such portions to deform in the only direction available whereby small discrete surface protrusions or bumps 2 are formed. Thus, the surface relief of the master 1 is formed directly; i.e., without formation of conventional pits. If desired, heating of discrete localized portions of the ion exchanged layer can be achieved by means other than a high intensity light beam, such as by an appropriately controlled electron or ion beam.

As noted, the 7740 glass contains 4 mole percent $Na_2O$. Borosilicate glasses containing an oxide modifier of higher content could be used and would provide additional advantages. First, such glasses would have a lower softening temperature, and thus require less write beam energy for glass softening and resultant release of compressive stress energy. Secondly, such glasses would provide more lattice sites for the exchange ions to occupy, thus increasing the absorptivity of such glass and further decreasing write beam energy requirements.

The glass substrate can contain an oxide modifier other than sodium oxide. For example, the glass substrate could contain either potassium oxide or lithium oxide as an oxide modifier instead of sodium oxide, or a combination of two or more of the oxides. $Cu^+/K^+$ and $Cu^+/Li^+$ ion exchanges would be achieved in substantially the same manner that a $Cu^+/Na^+$ ion exchange is achieved, however, a $Cu^+/Na^+$ ion exchange is preferred because $Na^+$ ions out-diffuse much better than either $K^+$ ions or $Li^+$ ions.

Figure 4:
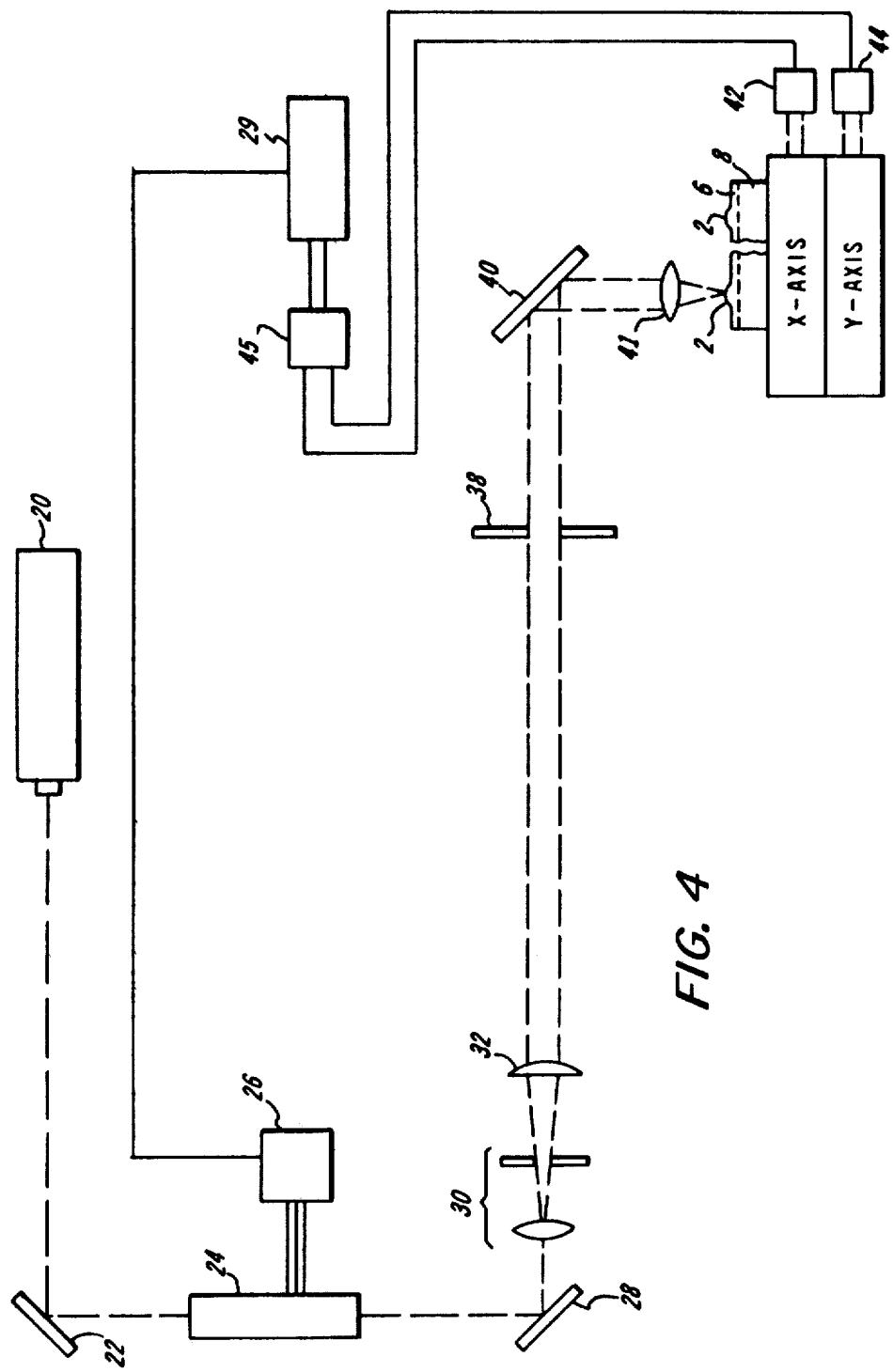
FIG. 4 is a block diagram of an optical system for producing a master in accordance with the invention.

FIG. 4 depicts an exemplary system for recording the bumps 2. An Argon laser 20, such as Lexel Model 95-4, emits a coherent 488 nanometer light beam. The emitted light beam (the write beam) is directed by a mirror 22 onto a conventional electro-optic modulator 24 with associated power supply 26, such as sold by Coherent Associates, which function to amplitude modulate the write beam in accordance with the sequence of video signals received in a conventional manner from a video control processor 29, such as a 48K Apple II computer/video camera arrangement. Mirror 28 directs the modulated write beam onto a spatial filter 30 which "cleans up" the write beam before it reaches a collimating lens 32 which recollimates and expands the beam (spatial filter 30 having uncollimated the write beam). The diameter of the "clean" write beam is regulated by the controlled aperture member 38, with the properly diametered write beam being directed by mirror 40 onto a lens 41 which focuses the write beam onto a discrete portion of the surface 4 of ion exchanged layer 6. Surface 4 of layer 6 is moved relative to the write beam along 'x' and 'y' coordinates of, for example, a spiral track, by stepper motors 42 and 44 which are controlled in a conventional manner by stepping motor controls 45 receiving appropriate inputs from the control processor 29. Accordingly, the write beam successively heats selected portions of the ion exchanged layer 6, resulting in the localized release of stored compressive stress energy and the formation of solid data bumps 2, whereby a video master 1 is formed directly. By regulating the amplitude of the write beam and/or its pulse length, the size (height) of the bumps 2 can be regulated to thereby convey the information content of an analog signal. To convey the information content of a digital signal, the write beam would simply be modulated on and off, or between two appropriate energy levels.

The size of bumps 2 is dependent upon several factors including the compressive stress energy of layer 6, the optical absorptivity of layer 6, and the power and pulse length of the write beam. Using copper ion exchanged 7740 glass produced by immersing 7740 glass in a molten (550° C.) copper chloride bath for 1320 minutes and an Argon laser (emission at 488 microns) operated to deliver one (1) microsecond pulses of 30 milliwatts at the surface of layer 6, bumps 2 are formed with a diameter of about 2.25 microns and a height of about 0.3–0.5 microns. Bumps of such size are formed when the lens 41 is a conventional 10 power microscope objective. Smaller diameter bumps, on the order of 0.5 microns, are formed when the lens 41 is of higher power, 60× being typical. The relatively large height of the bumps 2 provides a high signal-to-noise ratio compared to that of masters using ablated tellurium. Also, since the data is stored as part (solid surface bumps) of an extremely rugged material (glass), archival storage is readily achieved without need for protective encasement. Additionally, since the medium of the master is an extremely inexpensive material, a very low cost master is provided.

Although superior to ablated tellurium structures as a video master in several aspects, the ion exchanged master disclosed requires more energy for data storage than does a master utilizing ablated tellurium. For example, it typically requires on the order of 0.25 nanojules of energy to ablate tellurium and 30 nanojules of energy to form bumps 2. The data storage energy requirements of a copper ion exchanged layer can be reduced by hydrogen reduction wherein a hydrogen containing gas, such as forming gas (80% nitrogen, 20% hydrogen) is caused to flow over a heated (400° Centigrade) ion exchanged layer for a period of time (from one to several hours) directly proportional to the thickness of the ion exchanged layer. The hydrogen flow causes the copper ions to become minute particles of metallic copper ($Cu°$). The presence of metallic copper in the ion exchanged layer increases the absorptivity of the ion exchanged layer, as shown by curves B and C of FIG. 3 for hydrogen reduction times of one and 6 hours, respectively. The increased absorptivity of the ion exchanged layer reduces the amount of write beam energy needed to soften discrete portions of the ion exchanged layer to the point where the compressive stress energy of those discrete portions is released as bumps 2. As an example, when a sample of 7740 glass has been CuCl ion-exchanged for 15 minutes at 550° Centigrade and then subsequently reduced in forming gas for 45 minutes at 400° Centigrade, bumps can be formed with write beam energies of less than one (1) nanojule. This occurs when lens 41 is a 60×,0.85N.A. objective.

Although an ion exchange between copper ions and ions of either sodium, potassium or lithium will provide an effective master material, the use of copper as a source of exchange ions cause the master material to have some inherent limitations. Specifically, the wavelength of the laser beam used for recording data on a $Cu^+/Na^+$ exchange material is restricted to the blue end of the spectrum since, as indicated by curve A of FIG. 3, a $Cu^+/Na^+$ exchange material has very low optical absorptivity at wavelengths substantially greater than 488 nanometers. Also, since $Cu^+$ ions are not much larger than $Na^+$ ions, the absolute amount of stored compressive stress energy is relatively low. Increased optical absorptivity at wavelengths in excess of 488 nanometers can be achieved by utilizing glass color filters, such as Schott BG-38 and BG-18, as the glass substrate 8. Significant optical absorptivity in the far red end of the spectrum (800–950 nanometers) would allow the use of diode lasers as the write beam source. Increased stored compressive stress energy can be achieved by utilizing exchange ions that have a much larger atomic radius than do the oxide modifier ions. For example, utilizing potassium ions as the exchange ions with a glass containing sodium oxide as the oxide modifier will provide a relatively large amount of compressive stress energy since potassium ions are much larger than sodium ions. In a manner similar to a $Cu^+/Na^+$ ion exchange, a $K^+/Na+$ ion exchange would be achieved by immersing a sodium oxide modified glass in a molten bath of a potassium salt, such as KCl.

Once formed, the master 1 is utilized in a conventional manner to produce mirror image (pits where the master has bumps and bumps where the master is flat) relief surface copies on a suitable, conventional substrate or disc, generally of a plastic material. The copies are generally formed by a pressing or stamping technique, or by an injection molding technique, with the copies having depressions at locations corresponding to locations of bumps on master 1. A thin layer of a light reflective material usually is applied over the relief surface to aid in readout, and a clear plastic coating is then applied as a protection coating for the light reflective layer.

Playback from the copies is achieved in a conventional manner. Light from a laser is directed through an optical system and focused upon the reflective layer of the disc. The presence or absence of depressions in the reflective layer determines the amount of reflection of light from the reflective layer, which is recaptured by a conventional optical system and transformed into an electrical signal in conventional manner by a photodetector. The detected signal is used to reconstruct the original video signal information conveyed by the write beam used to make the master 1.

Although the master 1 has been described in conjunction with the production of video discs, the mastering process is applicable to the production of other relief surface devices, for example, wave guides, surface relief gratings, microlens arrays, etc.

I claim:

1. A method of device replication comprising:
   providing a layer of glass which possesses stored energy in the form of compressive stress,
   heating localized portions of a surface of said layer sufficiently to release the compressive stress energy in the form of surface bumps at said localized portions, and
   utilizing said bumped surface to form at least one mirror image surface copy of said bumped surface.

2. A method of device replication comprising:
   providing a layer of glass which possesses stored energy in the form of compressive stress,
   heating by light energy localized portions of a surface of said layer sufficiently to release the compressive stress energy in the form of surface bumps at said localized portions, and
   utilizing said bumped surface to form at least one mirror image surface copy of said bumped surface.

3. A method of device replication comprising:
   providing a layer of glass which possesses stored energy in the form of compressive stress,
   heating localized portions of a surface of said layer sufficiently to release the compressive stress energy in the form of surface bumps at said localized portions,
   utilizing said bumped surface to form at least one mirror image surface copy of said bumped surface, and
   coating said mirror image surface copy with a layer of light reflective material.

4. A method of device replication comprising:
   providdng a layer of glass which possesses stored energy in the form of compressive stress,
   heating by light energy localized portions of a surface of said layer sufficiently to release the compressive stress energy in the form of surface bumps at said localized portions,
   utilizing said bumped surface as a master to form at least one mirror image surface copy of said bumped surface, and
   coating said mirror image surface copy with a layer of light reflective material.

5. A method of device replication comprising:
   providing a layer of glass which possesses stored energy in the form of compressive stress due to an ion exchange, such compressive stress due to an ion exchange being achieved by exposing a glass containing an oxide modifier to metallic ions that have both a greater affinity for occupying lattice sites of the glass than do the ions of the oxide modifier and an atomic radius larger than the atomic radius of the ions of the oxide modifier whereby the metallic ions replace glass lattice sites previously occupied by ions of oxide modifier,
   heating localized portions of a surface of said layer sufficiently to release the compressive stress energy in the form of surface bumps at said localized portions, and
   utilizing said bumped surface to form at least one mirror image surface copy of said bumped surface.

6. A method of device replication comprising:
   providing a layer of glass which possesses stored energy in the form of compressive stress due to an ion exchange, such compressive stress due to an ion exchange being achieved by exposing a glass containing an oxide modifier to metallic ions that have both a greater affinity for occupying lattice sites of the glass than do the ions of the oxide modifier and an atomic radius larger than the atomic radius of the ions of the oxide modifier whereby the metallic ions replace glass lattice sites previously occupied by ions of the oxide modifier,
   heating by light energy localized portions of a surface of said layer sufficiently to release the compressive stress energy in the form of surface bumps at said localized portions, and
   utilizing said bumped surface to form at least one mirror image surface copy of said bumped surface.

7. A method of device replication comprising:
   providing a layer of glass which possesses stored energy in the form of compressive stress due to an ion exchange, such compressive stress due to an ion exchange being achieved by exposing a glass containing an oxide modifier to metallic ions that have both a greater affinity for occupying lattice sites of the glass than do the ions of the oxide modifier and an atomic radius larger than the atomic radius of the ions of the oxide modifier whereby the metallic ions replace glass lattice sites previously occupied by ions of the oxide modifier, heating localized portions of a surface of said layer sufficiently to release the compressive stress energy in the form of surface bumps at said localized portions, utilizing said bumped surface to form at least one mirror image surface copy of said bumped surface, and coating said mirror image surface copy with a layer of light reflective material.

8. A method of device replication comprising:

providing a layer of glass which possesses stored energy in the form of compressive stress due to an ion exchange, such compressive stress due to an ion exchange being achieved by exposing a glass containing an oxide modifier to metallic ions that have both a greater affinity for occupying lattice sites of the glass than do the ions of the oxide modifier and an atomic radius larger than the atomic radius of the ions of the oxide modifier whereby the metallic ions replace glass lattice sites previously occupied by ions of the oxide modifier, heating by light energy localized portions of a surface of said layer sufficiently to release the compressive stress energy in the form of surface bumps at said localized portions, utilizing said bumped surface as a master to form at least one mirror image surface coy of said bumped surface, and coating said mirror image surface copy with a layer of light reflective material.

9. A method of device replication comprising:

providing a layer of borosilicate glass which possesses stored energy in the form of compressive stress due to an ion exchange, such compressive stress due to an ion exchange being achieved by exposing a borosilicate glass containing a sodium oxide modifier to a molten bath of metallic ions that have both a greater affinity for occupying lattice sites of the glass than do the sodium ions of the oxide modifier and an atomic radius larger than the atomic radius of the sodium ions of the oxide modifier whereby the metallic ions replace glass lattice sites previously occupied by sodium ions of the oxide modifier, heating localized portions of a surface of said layer sufficiently to release the compressive stress energy in the form of surface bumps at said localized portions, and utilizing said bumped surface to form at least one mirror image surface copy of said bumped surface.

* * * * *